(12) United States Patent
Sherwood et al.

(10) Patent No.: US 12,149,895 B2
(45) Date of Patent: Nov. 19, 2024

(54) METHODS, APPARATUS AND SYSTEMS FOR BIOMETRIC PROCESSES

(71) Applicant: Cirrus Logic International Semiconductor Ltd., Edinburgh (GB)

(72) Inventors: William E. Sherwood, Salt Lake City, UT (US); Cedric Andrieu, Edinburgh (GB); Ghassan Maalouli, Mesa, AZ (US); Khaled Lakhdhar, Salt Lake City, UT (US)

(73) Assignee: Cirrus Logic Inc., Austin, TX (US)

( * ) Notice: Subject to any disclaimer, the term of this patent is extended or adjusted under 35 U.S.C. 154(b) by 195 days.

(21) Appl. No.: 17/848,802

(22) Filed: Jun. 24, 2022

(65) Prior Publication Data
US 2023/0048401 A1 Feb. 16, 2023

Related U.S. Application Data

(60) Provisional application No. 63/274,566, filed on Nov. 2, 2021, provisional application No. 63/232,681, filed on Aug. 13, 2021.

(51) Int. Cl.
*H04R 29/00* (2006.01)
(52) U.S. Cl.
CPC .................................. *H04R 29/00* (2013.01)
(58) Field of Classification Search
CPC . H04R 3/00; H04R 3/005; H04R 3/04; H04R 3/12; H04R 29/00; H04R 29/001; H04R 29/004; H04R 29/005; H04R 1/1041; H04R 1/1008; H04R 1/1016; G10L 25/51; G10L 17/09; G10L 17/24; G10K 11/178;
(Continued)

(56) References Cited

U.S. PATENT DOCUMENTS 11,189,300 B2 * 11/2021 Harvey ................ G02B 27/017
2004/0215968 A1 10/2004 Rodwell et al.
(Continued)

FOREIGN PATENT DOCUMENTS

EP 4029442 A1 7/2022
WO 2021048974 A1 3/2021

OTHER PUBLICATIONS

Examination Report under Section 18(3), UKIPO, Application No. GB2211625.5, mailed Aug. 4, 2023.
(Continued)

*Primary Examiner* — Paul Kim
(74) *Attorney, Agent, or Firm* — Jackson Walker L.L.P.

(57) ABSTRACT

A method in a biometric authentication system, generating an acoustic stimulus for application to a user's ear; receiving an audio signal representing a response of the user's ear canal to the acoustic stimulus; adapting an ear canal response estimate of the user's ear canal to the acoustic stimulus to reduce an error between the audio signal and the ear canal response estimate; calculating one or more quality metrics, the quality metrics comprising one or more of: an ear canal response estimate quality metric comprising one or more energy characteristics of the ear canal response estimate; an error quality metric derived from the error; an audio response quality metric comprising one or more statistical characteristics of the audio signal; and determining a validity of the audio signal for use in a biometric process based on the quality metrics.

23 Claims, 12 Drawing Sheets

(58) Field of Classification Search
CPC ....... G10K 11/17817; G10K 11/17825; G10K 11/17854; G06F 21/32; G06F 2221/2103; G07C 9/37
See application file for complete search history.

(56) References Cited

U.S. PATENT DOCUMENTS

| | | | |
|---|---|---|---|
| 2019/0012445 A1* | 1/2019 | Lesso | G10L 17/24 |
| 2019/0012446 A1* | 1/2019 | Lesso | G10K 11/178 |
| 2019/0012447 A1* | 1/2019 | Lesso | G10K 11/17823 |
| 2019/0294769 A1 | 9/2019 | Lesso | |
| 2019/0370443 A1* | 12/2019 | Lesso | G06F 21/32 |
| 2020/0342082 A1* | 10/2020 | Sapozhnykov | G06V 40/10 |
| 2020/0342246 A1* | 10/2020 | Harvey | G06V 40/10 |
| 2022/0295170 A1* | 9/2022 | Ito | G06F 21/32 |

OTHER PUBLICATIONS

Combined Search and Examination Report under Sections 17 and 18(3), UKIPO, Application No. GB2211625.5, mailed Mar. 28, 2023.

* cited by examiner

METHODS, APPARATUS AND SYSTEMS FOR BIOMETRIC PROCESSES

TECHNICAL FIELD

Embodiments of the disclosure relate to methods, apparatus and systems for biometric processes, and particularly to methods, apparatus and systems for biometric processes involving the measured response of a user's ear to an acoustic stimulus.

BACKGROUND

It is known that the acoustic properties of a user's ear, whether the outer parts (known as the pinna or auricle), the ear canal or both, differ substantially between individuals and can therefore be used as a biometric to identify the user. One or more loudspeakers or similar transducers positioned close to or within the ear generate an acoustic stimulus, and one or more microphones similarly positioned close to or within the ear detect the acoustic response of the ear to the acoustic stimulus. One or more features may be extracted from the response signal and used to characterize an individual.

For example, the ear canal is a resonant system, and therefore one feature which may be extracted from the response signal is the resonant frequency of the ear canal. If the measured resonant frequency (i.e. in the response signal) differs from a stored resonant frequency for the user, a biometric algorithm coupled to receive and analyse the response signal may return a negative result. Other features of the response signal may be similarly extracted and used to characterize the individual. For example, the features may comprise one or more mel frequency cepstrum coefficients. More generally, the transfer function between the acoustic stimulus and the measured response signal (or features of the transfer function) may be determined and compared to a stored transfer function (or stored features of the transfer function) which is characteristic of the user.

One problem associated with ear biometric systems is that the signal to noise ratio of the measured response signal is typically quite low as the biometric features of the signal are relatively weak. This problem can be exacerbated depending on a number of factors. For example, the user may be present in a noisy environment. For example, earphones used to acquire the ear biometric data may be poorly fitted to the user's ear (e.g. inserted too far into the user's ear, or not sufficiently inserted).

Alternatively or additionally, nefarious third parties may seek to bypass the authentication system by using a fabricated signal.

SUMMARY

According to a first aspect of the disclosure, there is provided a method in a biometric authentication system, generating an acoustic stimulus for application to a user's ear; receiving an audio signal representing a response of the user's ear canal to the acoustic stimulus; adapting an ear canal response estimate of the user's ear canal to the acoustic stimulus to reduce an error between the audio signal and the ear canal response estimate; calculating one or more quality metrics, the quality metrics comprising one or more of: an ear canal response estimate quality metric comprising one or more energy characteristics of the ear canal response estimate; an error quality metric derived from the error; an audio response quality metric comprising one or more statistical characteristics of the audio signal; and determining a validity of the audio signal for use in a biometric process based on the quality metrics.

The method may further comprise combining two or more of the one or more quality metrics to generate a combined quality output, wherein the audio signal is validated based on the combined quality output.

The method may further comprise aborting the adaptation of the ear canal response estimate based on the audio response quality metric. In doing so, processor intensive operations associated with adaptation of the ear canal response estimate may be ceased. This may lead to reduced power consumption as well as faster operation of the biometric process (e.g. a faster authentication result). For example, an early indication of the validity of the audio signal may be ascertained based on the audio response quality metric, without the need to adapt the ear canal response estimate.

The method may further comprise aborting the adaptation if it is determined that the one or more statistical characteristics fail to meet one or more predetermined criteria.

The one or more statistical characteristics may comprise one or more of a shape of a distribution of the audio signal, such as a magnitude distribution or an amplitude distribution, and a tail size of a distribution of the audio signal.

The one or more statistical characteristics may be accumulated over time by analysing the audio signal over a moving time window.

The method may further comprise comparing the one or more statistical characteristics with one or more template statistical characteristics.

The method may further comprise transforming the one or more statistical characteristics before the comparison. In doing so, audio responses to acoustic stimuli having a non-white noise spectrum can still be compared to template statistics characteristics obtained in white noise conditions. Transforming the one or more statistical characteristics may comprise one or more of normalization or standardization.

The method may further comprise comparing a statistical distribution of the error with a template error distribution; and determining the validity of the audio signal for use in a biometric process based on the comparison.

The statistical distribution of the error may comprise one or more of: a $3^{rd}$ order moment; a $4^{th}$ order moment; a decal of a $3^{rd}$ order moment or a $4^{th}$ order moment over time.

The one or more energy statistics may comprise one or more of: a total tap energy norm; a total tap energy norm ratio; a ratio of a first reflection peak to a total tap energy norm; a slope of intercept of a regression fit to $\log|H(f)|$, where $H(f)$ is a Hilbert transform of the ear canal response estimate; and an envelope curvature of the ear canal response estimate.

The method may further comprise: comparing the one or more energy statistics with one or more energy statistic thresholds; and determining the validity of the audio signal for use in a biometric process based on the comparison. The one or more energy statistic thresholds may be adapted based on the error.

The one or more energy statistic thresholds may be adapted based on a depth of convergence terms of the ear canal response estimate.

According to another aspect of the disclosure, there is provided a biometric authentication system, comprising: a first transducer configured to generate an acoustic stimulus for application to a user's ear; a second transducer for generating an audio signal representing a response of the user's ear canal to the acoustic stimulus; one or more processors configured to: adapt an ear canal response estimate of the user's ear canal to the acoustic stimulus to reduce an error between the audio signal and the ear canal response estimate; calculate one or more quality metrics, the quality metrics comprising one or more of: an ear canal response estimate quality metric comprising one or more energy characteristics of the ear canal response estimate; an error quality metric derived from the error; an audio response quality metric comprising one or more statistical characteristics of the audio signal; and determine a validity of the audio signal for use in a biometric process based on the one or more quality metrics.

According to another aspect of the disclosure, there is provided a method in a biometric authentication system, generating an acoustic stimulus for application to a user's ear; receiving an audio signal representing a response of the user's ear canal to the acoustic stimulus; calculating one or more quality metrics comprising an audio response quality metric representing a quality of the audio signal; controlling, based on the audio response quality metric, adaptation of an ear canal response estimate of the user's ear canal to the acoustic stimulus to reduce an error between the audio signal and the ear canal response estimate.

The controlling may comprise aborting the adaptation of the ear canal response estimate based on a value of the audio response metric. In doing so, processor intensive operations associated with adaptation of the ear canal response estimate may be ceased. This may lead to reduced power consumption as well as faster operation of the biometric process (e.g. a faster authentication result). For example, an early indication of the validity of the audio signal may be ascertained based on the audio response quality metric, without the need to adapt the ear canal response estimate.

The controlling may comprise: triggering the adaptation of the ear canal response estimate based on a value of the audio response metric, for example if the audio response metric value exceeds a threshold associated with a suitability of the audio response in a biometric process. Again, by only triggering adaptation of the ear canal response estimate when the audio response metric meets predetermined criteria, energy consumption may be reduced.

The method may further comprise determining a validity of the audio signal for use in a biometric process based on the one or more quality metrics.

The method may further comprise: combining two or more of the one or more quality metrics to generate a combined quality output. The audio signal may be validated based on the combined quality output.

The audio response quality metric may comprise one or more statistical characteristics of the audio signal, and wherein the controlling is performed based on the one or more statistical.

The one or more statistical characteristics may comprise one or more of: a shape of a distribution of the audio signal; and a tail size of a distribution of the audio signal.

The method may further comprise transforming the one or more statistical characteristics before the comparison. In doing so, audio responses to acoustic stimuli having a non-white noise spectrum can still be compared to template statistics characteristics obtained in white noise conditions. Transforming the one or more statistical characteristics may comprise one or more of normalization or standardization.

The audio response quality metric may be accumulated over time by analysing the audio signal over a moving time window.

The one or more quality metrics may further comprise one or more of: an ear canal response estimate quality metric comprising one or more energy characteristics of the ear canal response estimate; and an error quality metric derived from the error.

The method may further comprise: comparing a statistical distribution of the error with a template error distribution; and determining the validity of the audio signal for use in a biometric process based on the comparison.

The statistical distribution of the error may comprise one or more of: a $3^{rd}$ order moment; a $4^{th}$ order moment; a decal of a $3^{rd}$ order moment or a $4^{th}$ order moment over time.

The one or more energy statistics may comprises one or more of: a total tap energy norm; a total tap energy norm ratio; a ratio of a first reflection peak to a total tap energy norm; a slope of intercept of a regression fit to $\log|H(f)|$, where $H(f)$ is a Hilbert transform of the ear canal response estimate; and an envelope curvature of the ear canal response estimate.

The method may further comprise: comparing the one or more energy statistics with one or more energy statistic thresholds; and determining a validity of the audio signal for use in a biometric process based on the comparison.

The one or more energy statistic thresholds are adapted based on the error.

The one or more energy statistic thresholds may be adapted based on a depth of convergence terms of the ear canal response estimate.

According to another aspect of the disclosure, there is provided a biometric authentication system, a first transducer configured to generate an acoustic stimulus for application to a user's ear; a second transducer for generating an audio signal representing a response of the user's ear canal to the acoustic stimulus; one or more processors configured to: calculating one or more quality metrics comprising an audio response quality metric representing a quality of the audio signal; controlling, based on the audio response quality metric, adaptation of an ear canal response estimate of the user's ear canal to the acoustic stimulus to reduce an error between the audio signal and the ear canal response estimate.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF DRAWINGS

Embodiments of the present disclosure will now be described by way of non-limiting examples with reference to the drawings, in which.

DESCRIPTION OF EMBODIMENTS

Embodiments of the present disclosure relate to method and systems for characterising the quality of a received audio signal by determining one or more quality metrics. Such methods may be used to determine whether the received audio signal (or aspects thereof) should be used in a biometric process.

As noted above, ear biometric data may be acquired by the generation of an acoustic stimulus, and the detection of an acoustic response of the ear to the acoustic stimulus. One or more features may be extracted from the response signal, and used to characterize the individual.

The acoustic stimulus may be generated, and the response measured using a personal audio device. As used herein, the term "personal audio device" is any electronic device which is suitable for, or configurable to, provide audio playback substantially to only a single user. Some examples of suitable personal audio devices are shown in FIGS. 1*a* to 1*e*.

Figure 1A:
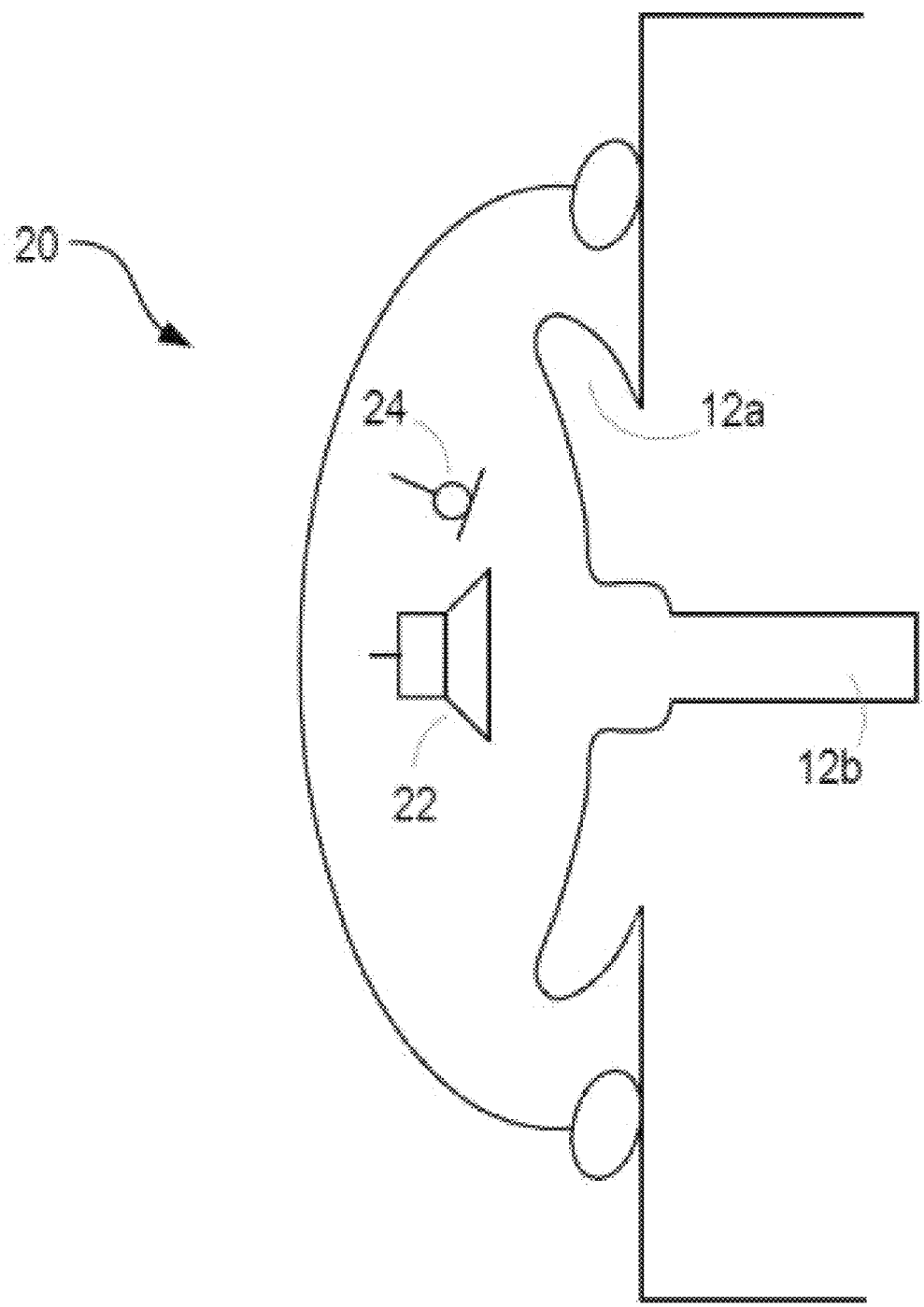
FIGS. 1a to 1e show examples of personal audio devices.

FIG. 1*a* shows a schematic diagram of a user's ear, comprising the (external) pinna or auricle 12*a*, and the (internal) ear canal 12*b*. A personal audio device 20 comprising a circum-aural headphone is worn by the user over the ear. The headphone comprises a shell which substantially surrounds and encloses the auricle 12*a*, so as to provide a physical barrier between the user's ear and the external environment. Cushioning or padding may be provided at an edge of the shell, so as to increase the comfort of the user, and also the acoustic coupling between the headphone and the user's skin (i.e. to provide a more effective barrier between the external environment and the user's ear).

The headphone comprises one or more loudspeakers 22 positioned on an internal surface of the headphone and arranged to generate acoustic signals towards the user's ear and particularly the ear canal 12*b*. The headphone further comprises one or more microphones 24, also positioned on the internal surface of the headphone, arranged to detect acoustic signals within the internal volume defined by the headphone, the auricle 12*a* and the ear canal 12*b*.

The headphone may be able to perform active noise cancellation, to reduce the amount of noise experienced by the user of the headphone. Active noise cancellation operates by detecting a noise (i.e. with a microphone) and generating a signal (i.e. with a loudspeaker) that has the same amplitude as the noise signal but is opposite in phase. The generated signal thus interferes destructively with the noise and so lessens the noise experienced by the user. Active noise cancellation may operate on the basis of feedback signals, feedforward signals, or a combination of both. Feedforward active noise cancellation utilizes one or more microphones on an external surface of the headphone, operative to detect the environmental noise before it reaches the user's ear. The detected noise is processed quickly, and the cancellation signal generated so as to match the incoming noise as it arrives at the user's ear. Feedback active noise cancellation utilizes one or more error microphones positioned on the internal surface of the headphone, operative to detect the combination of the noise and the audio playback signal generated by the one or more loudspeakers. This combination is used in a feedback loop, together with knowledge of the audio playback signal, to adjust the cancelling signal generated by the loudspeaker and so reduce the noise. The microphone 24 shown in FIG. 1*a* may therefore form part of an active noise cancellation system, for example, as an error microphone.

Figure 1B:
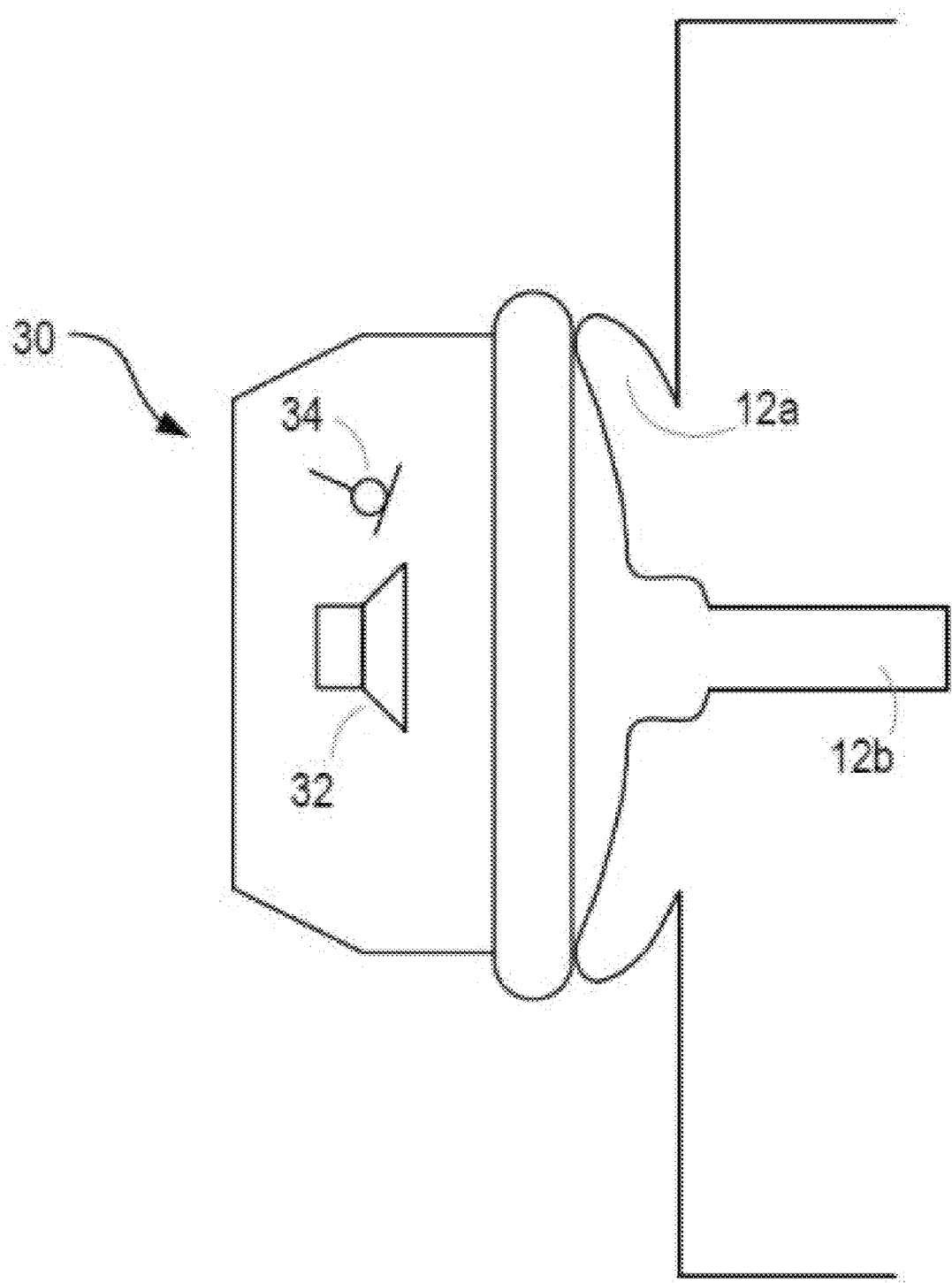

FIG. 1*b* shows an alternative personal audio device 30, comprising a supra-aural headphone. The supra-aural headphone does not surround or enclose the user's ear, but rather sits on the auricle 12*a*. The headphone may comprise a cushion or padding to lessen the impact of environmental noise. As with the circum-aural headphone shown in FIG. 1*a*, the supra-aural headphone comprises one or more loudspeakers 32 and one or more microphones 34. The loudspeaker(s) 32 and the microphone(s) 34 may form part of an active noise cancellation system, with the microphone 34 serving as an error microphone.

Figure 1C:
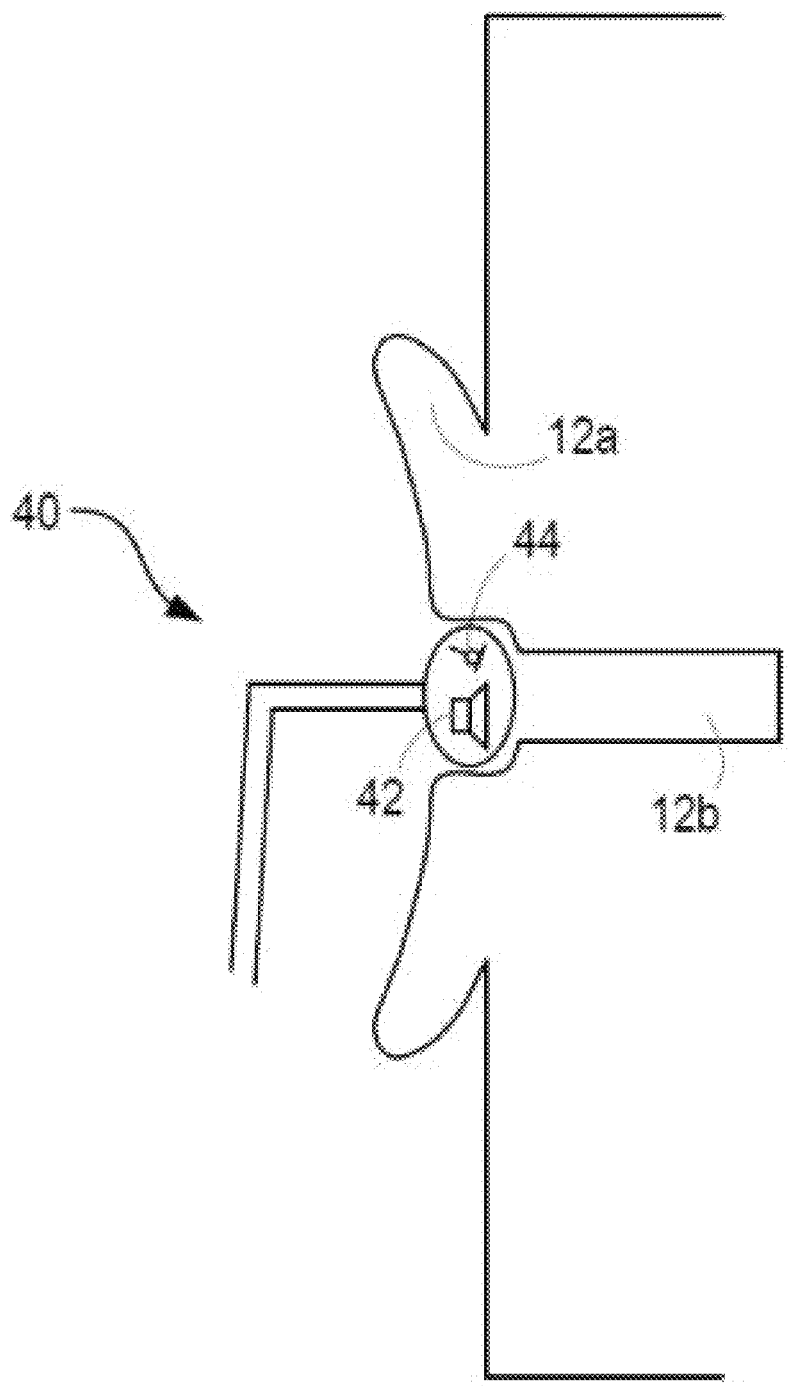

FIG. 1*c* shows a further alternative personal audio device 40, comprising an intra-concha headphone (or earphone). In use, the intra-concha headphone sits inside the user's concha cavity. The intra-concha headphone may fit loosely within the cavity, allowing the flow of air into and out of the user's ear canal 12*b*.

As with the devices shown in FIGS. 1*a* and 1*b*, the intra-concha headphone comprises one or more loudspeakers 42 and one or more microphones 44, which may form part of an active noise cancellation system.

Figure 1D:
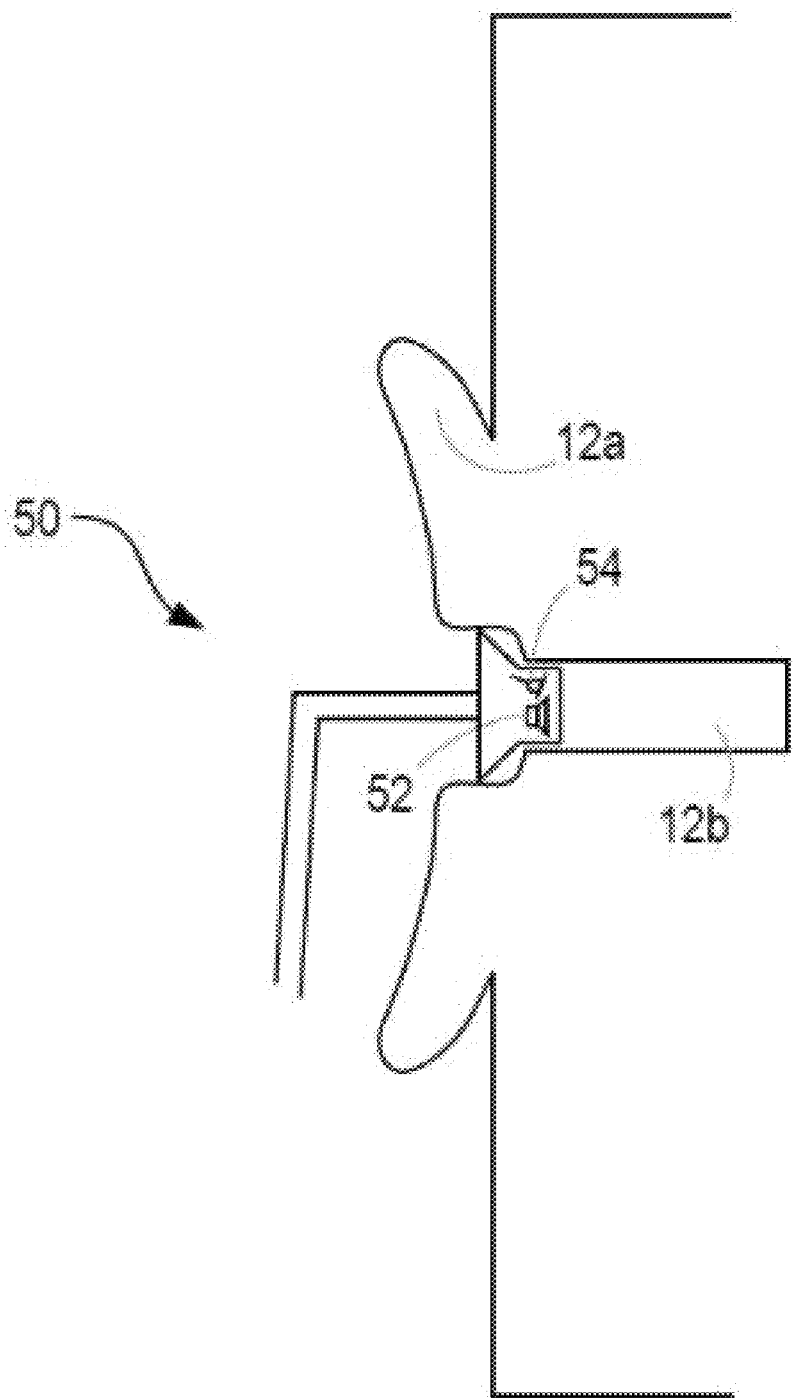

FIG. 1*d* shows a further alternative personal audio device 50, comprising an in-ear headphone (or earphone), insert headphone, or ear bud. This headphone is configured to be partially or totally inserted within the ear canal 12*b* and may provide a relatively tight seal between the ear canal 12*b* and the external environment (i.e. it may be acoustically closed or sealed). The headphone may comprise one or more loudspeakers 52 and one or more microphones 54, as with the other devices described above, and these components may form part of an active noise cancellation system.

As the in-ear headphone may provide a relatively tight acoustic seal around the ear canal 12*b*, external noise (i.e. coming from the environment outside) detected by the microphone 54 is likely to be low.

Figure 1E:
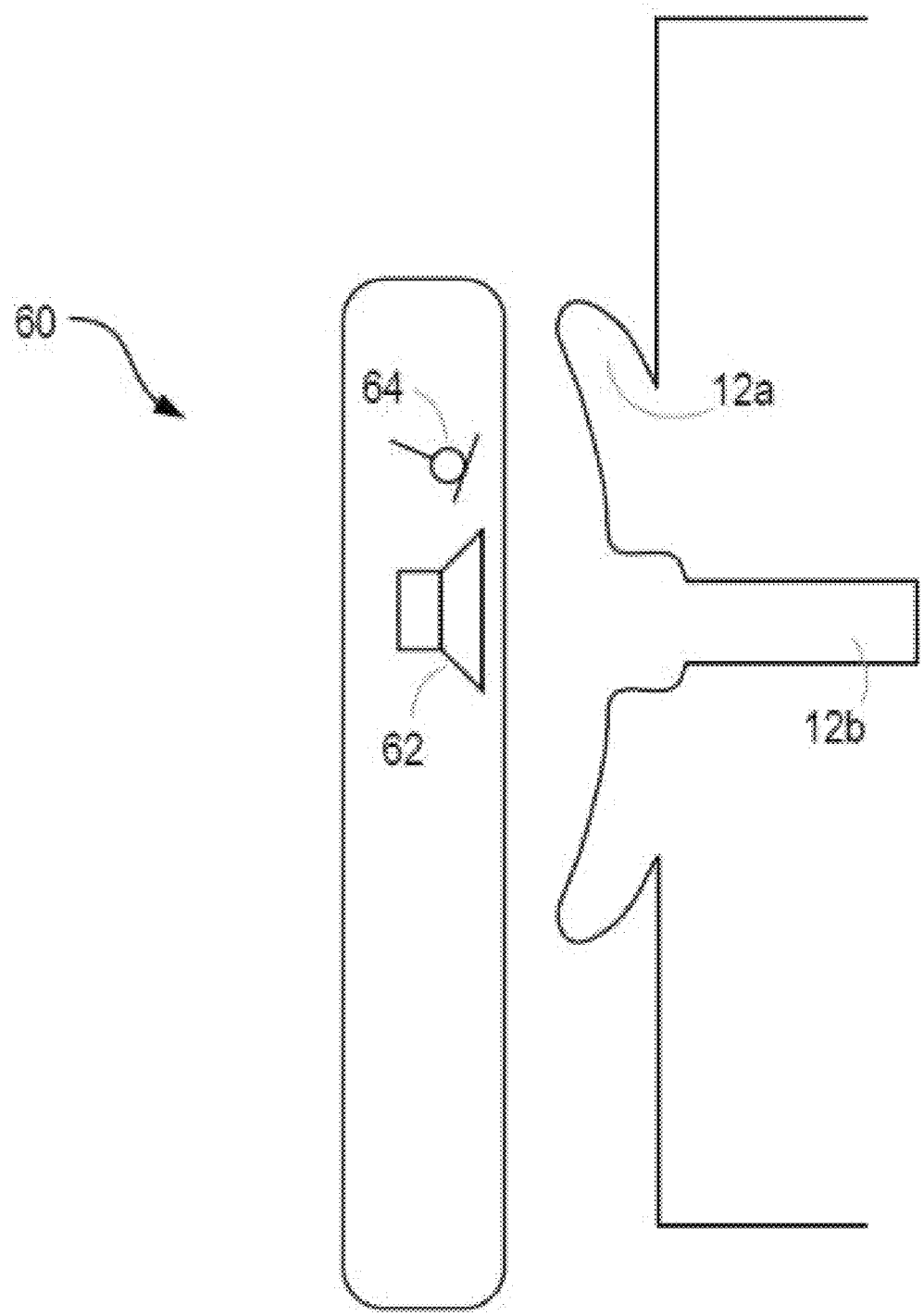

FIG. 1*e* shows a further alternative personal audio device 60, which is a mobile or cellular phone or handset. The handset 60 comprises one or more loudspeakers 62 for audio playback to the user, and one or more microphones 64 which are similarly positioned.

In use, the handset 60 is held close to the user's ear so as to provide audio playback (e.g. during a call). While a tight acoustic seal is not achieved between the handset 60 and the user's ear, the handset 60 is typically held close enough that an acoustic stimulus applied to the ear via the one or more loudspeakers 62 generates a response from the ear which can be detected by the one or more microphones 64. As with the other devices, the loudspeaker(s) 62 and microphone(s) 64 may form part of an active noise cancellation system.

All of the personal audio devices described above thus provide audio playback to substantially a single user in use. Each device comprises one or more loudspeakers and one or more microphones, which may be utilized to generate biometric data related to the frequency response of the user's ear. The loudspeaker is operable to generate an acoustic stimulus, or acoustic probing wave, towards the user's ear, and the microphone is operable to detect and measure a response of the user's ear to the acoustic stimulus, e.g. to measure acoustic waves reflected from the ear canal or the pinna. The acoustic stimulus may be sonic (for example in the audio frequency range of say 20 Hz to 20 kHz) or ultra-sonic (for example greater than 20 kHz or in the range 20 KHz to 50 kHz) or near-ultrasonic (for example in the range 15 kHz to 25 kHz) in frequency. In some examples the microphone signal may be processed to measure received signals of the same frequency as that transmitted.

Another biometric marker may comprise otoacoustic noises emitted by the cochlear in response to the acoustic stimulus waveform. The otoacoustic response may comprise a mix of the frequencies in the input waveform. For example if the input acoustic stimulus consists of two tones at frequencies f1 and f2, the otoacoustic emission may include a component at frequency 2*f1-f2. The relative power of frequency components of the emitted waveform has been shown to be a useful biometric indicator. In some examples therefore the acoustic stimulus may comprise tones of two or more frequencies and the amplitude of mixing products at sums or differences of integer-multiple frequencies generated by otoacoustic emissions from the cochlear may be measured. Alternatively, otoacoustic emissions may be stimulated and measured by using stimulus waveforms comprising fast transients, e.g. clicks.

Depending on the construction and usage of the personal audio device, the measured response may comprise user-specific components, i.e. biometric data relating to the auricle 12a, the ear canal 12b, or a combination of both the auricle 12a and the ear canal 12b. For example, the circumaural headphones shown in FIG. 1a will generally acquire data relating to the auricle 12a and potentially also the ear canal 12b. The insert headphones shown in FIG. 1d will generally acquire data relating only to the ear canal 12b.

One or more of the personal audio devices described above (or rather, the microphones within those devices) may be operable to detect bone-conducted voice signals from the user. That is, as the user speaks, sound is projected away from the user's mouth through the air. However, acoustic vibrations will also be carried through part of the user's skeleton or skull, such as the jawbone. These acoustic vibrations may be coupled to the ear canal 12b through the jaw or some other part of the user's skeleton or skull, and detected by the microphone. Lower frequency sounds tend to experience a stronger coupling than higher frequency sounds, and voiced speech (i.e. that speech or those phonemes generated while the vocal cords are vibrating) is coupled more strongly via bone conduction than unvoiced speech (i.e. that speech or those phonemes generated while the vocal cords are not vibrating). The in-ear headphone 50 may be particularly suited to detecting bone-conducted speech owing to the tight acoustic coupling around the ear canal 12b.

All of the devices shown in FIGS. 1a to 1e and described above may be used to implement aspects of the disclosure.

Figure 2:
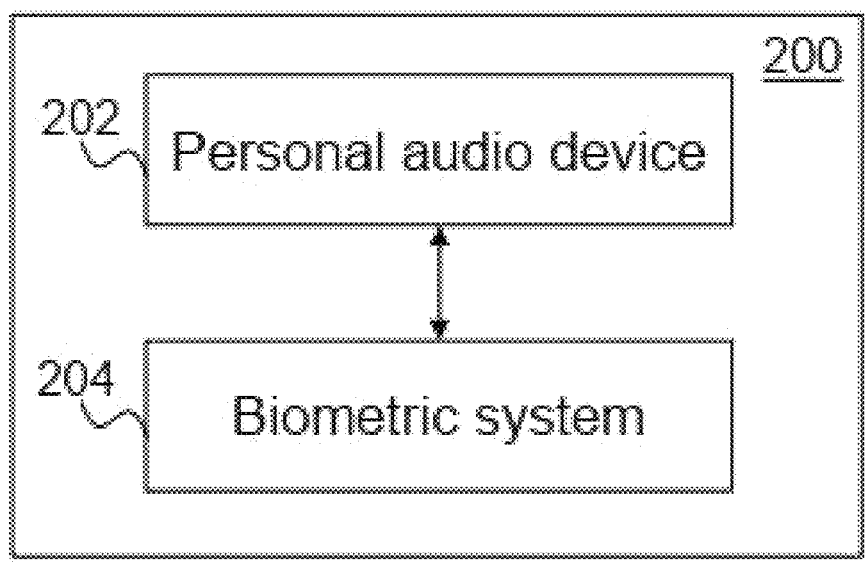
FIG. 2 shows an arrangement according to embodiments of the disclosure.

FIG. 2 shows an arrangement 200 according to embodiments of the disclosure. The arrangement 200 comprises a personal audio device 202 and a biometric system 204. The personal audio device 202 may be any device which is suitable for, or configurable to provide audio playback to substantially a single user. The personal audio device 202 generally comprises one or more loudspeakers, and one or more microphones which, in use, are positioned adjacent to or within a user's ear. The personal audio device 202 may be wearable and comprise headphones for each of the user's ears. Alternatively, the personal audio device 202 may be operable to be carried by the user and held adjacent to the user's ear or ears during use. The personal audio device 202 may comprise headphones or a mobile phone handset, as described above with respect to any of FIGS. 1a to 1e.

The biometric system 204 is coupled to the personal audio device 202 and operative to control the personal audio device 202 to acquire biometric data which is indicative of the individual using the personal audio device 202.

The personal audio device 202 thus generates an acoustic stimulus for application to the user's ear and detects or measures the response of the ear to the acoustic stimulus. For example, the acoustic stimulus may be in the sonic range, or ultra-sonic. In some embodiments, the acoustic stimulus may have a flat frequency spectrum over a relevant frequency range or be pre-processed in such a way that those frequencies that allow for a good discrimination between individuals are emphasized (i.e. have a higher amplitude than other frequencies). The measured response corresponds to the reflected signal received at the one or more microphones, with certain frequencies being reflected at higher amplitudes than other frequencies owing to the particular response of the user's ear.

The biometric system 204 may send suitable control signals to the personal audio device 202, so as to initiate the acquisition of biometric data, and receive data from the personal audio device 202 corresponding to the measured response. The biometric system 204 is operable to extract one or more features from the measured response and utilize those features as part of a biometric process.

Some examples of suitable biometric processes include biometric enrolment and biometric authentication. Enrolment comprises the acquisition and storage of biometric data which is characteristic of an individual. In the present context, such stored data may be known as an "ear print". Authentication (sometimes referred to as verification or identification) comprises the acquisition of biometric data from an individual, and the comparison of that data to the stored ear prints of one or more enrolled or authorised users. A positive comparison (i.e. a determination that the acquired data matches or is sufficiently close to a stored ear print) results in the individual being authenticated. For example, the individual may be permitted to carry out a restricted action or granted access to a restricted area or device. A negative comparison (i.e. a determination that the acquired data does not match or is not sufficiently close to a stored ear print) results in the individual not being authenticated. For example, the individual may not be permitted to carry out the restricted action or granted access to the restricted area or device.

The biometric system 204 may, in some embodiments, form part of the personal audio device 202 itself. Alternatively, the biometric system 204 may form part of an electronic host device (e.g. an audio player) to which the personal audio device 202 is coupled, through wires or wirelessly. In yet further embodiments, operations of the biometric system 204 may be distributed between circuitry in the personal audio device 202 and the electronic host device.

In embodiments of the present disclosure, the biometric system 204 may determine quality metrics relating to a response of an ear canal to an acoustic stimulus (an audio signal or channel output). Such quality metrics may be referred to herein as audio signal quality metrics or channel output quality metrics. Channel output characteristics may be derived from the channel output (or measured response of the user's ear). For example, the quality metrics may relate to the channel output itself or a Fourier transform of the channel output.

Additionally, the biometric system 204 may determine quality metrics of a channel estimate (such as an ear canal estimate) determined based on a comparison between the acoustic stimulus and the received audio response (channel output). In such embodiments, an error between a channel estimate and the actual channel output may be used to adapt the estimation of the channel estimate to be closer to the channel output. Such quality metrics may relate to the channel estimate itself, or the error (e.g. a residual) between the channel estimate and the actual channel output. Such metrics may be referred to herein as channel estimate quality metrics.

According to a first aspect of the disclosure, the calculated quality metric(s) may be used to determine the validity of an audio signal received at one or more microphones of the personal audio device for use in the biometric process. If the features are not validated for use in the biometric process, the biometric process may be not carried out or, if already started, the biometric process may be halted. In a further alternative, the result of the biometric process may be validated or invalidated based on the one or more calculated quality metrics. For example, a biometric enrolment may be annulled, even if it was otherwise successful in extracting the required features to generate the ear print. For example, a biometric authentication result may be invalidated or made negative, even if the authentication result was otherwise positive.

According to a further aspect of the disclosure, calculated quality metric(s) pertaining to the audio signal itself (i.e. channel output quality metrics) may be used to control the adaptation of the channel estimate. For example, the channel output quality metrics may be used to detect anomalies present in the audio signal. Where it is determined that anomalies are present, generation and/or adaptation of the channel estimate may be paused or aborted. Additionally, or alternatively, where it is determined that anomalies are not present, i.e., that the channel output (audio signal) appears acceptable, generation and/or adaptation of the channel estimate may be triggered. Thus, the channel output quality metrics may be used as an early detection mechanism to detect invalid or unusable responses (and/or problems associated with a biometric process being performed). The analysis of channel output quality metrics may be performed prior to the extraction of features relating to the channel estimate. As such, any such feature extraction may be aborted, restarted or prevented from occurring altogether, leading to savings in power and a faster authentication result (positive or negative). In addition, such processing may lead to a more pleasant user experience, since the generation of additional acoustic stimuli may be aborted if a channel anomaly is detected early using the channel output quality metrics.

Further detail regarding these aspects is provided below with respect to FIGS. 3 and 4.

Figure 3:
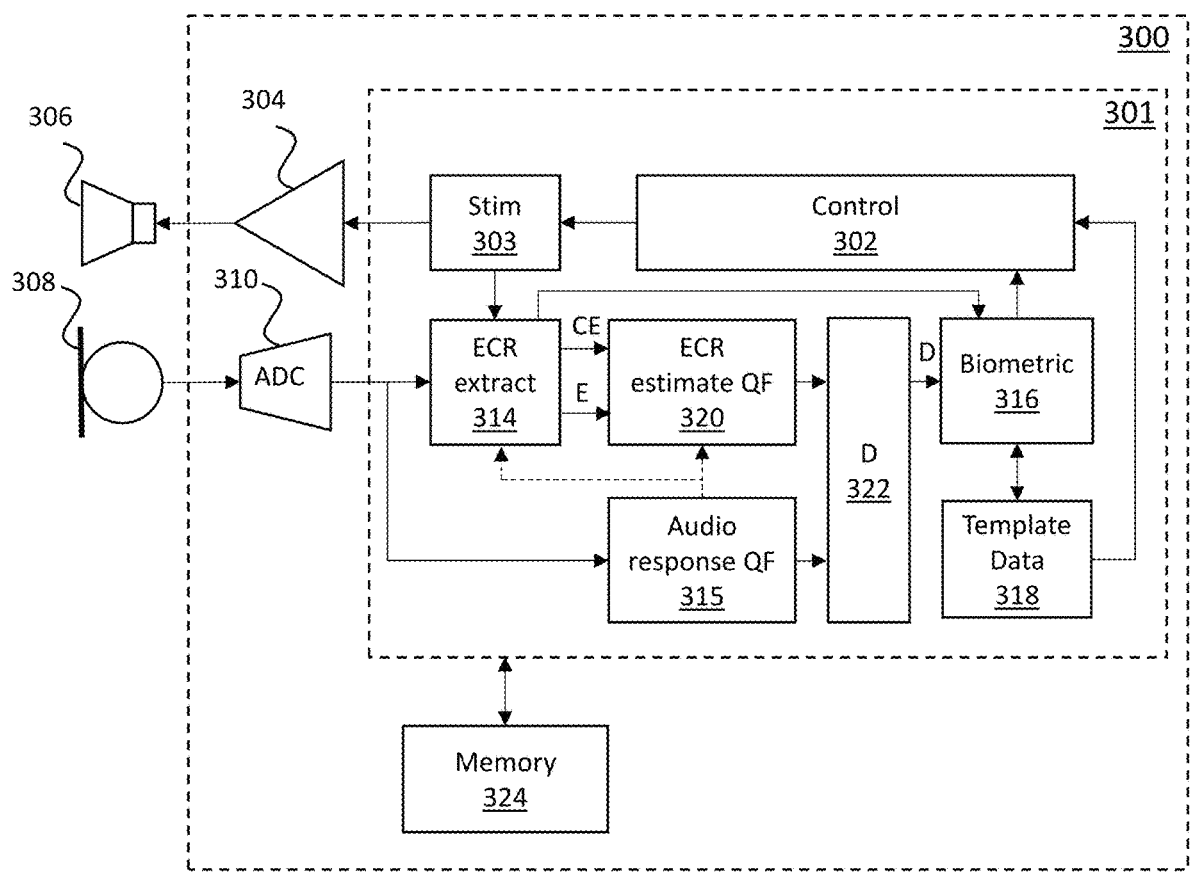
FIG. 3 shows a system according to embodiments of the disclosure.

FIG. 3 shows a system 300 according to embodiments of the disclosure.

The system 300 comprises processing circuitry 301, which may comprise one or more processors, such as a central processing unit or an applications processor (AP), or a digital signal processor (DSP).

The one or more processors may perform methods as described herein on the basis of data and program instructions stored in memory 324. Memory 324 may be provided as a single component or as multiple components or co-integrated with at least some of processing circuitry 301. Specifically, the methods described herein can be performed in processing circuitry 301 by executing instructions that are stored in non-transient form in the memory 324, with the program instructions being stored either during manufacture of the system 300 or personal audio device 202 or by upload while the system or device is in use.

The processing circuitry 301 comprises a stimulus generator 303 which is coupled directly or indirectly to an amplifier 304, which in turn is coupled to a loudspeaker 306.

The stimulus generator 303 generates an electrical audio signal and provides the electrical audio signal to the amplifier 304, which amplifies it and provides the amplified signal to the loudspeaker 306. The loudspeaker 306 generates a corresponding acoustic signal which is output to the user's ear (or ears). The audio signal may be sonic or ultra-sonic, for example. The audio signal may have a flat frequency spectrum (e.g. white noise) or be preprocessed in such a way that those frequencies that allow for a good discrimination between individuals are emphasized (i.e. have a higher amplitude than other frequencies). In other embodiments, the audio signal may not have a flat frequency spectrum (e.g. non-white noise). For example, the audio signal may be a media playback signal.

As noted above, the audio signal may be output to all or a part of the user's ear (i.e. the auricle 12*a* or the ear canal 12*b* shown in FIGS. 1*a* to 1*e*). The audio signal is reflected off the ear, and the reflected signal (or echo signal) is detected and received by a microphone 308. The reflected signal thus comprises data, which is characteristic of the individual's ear, and suitable for use as a biometric.

The reflected signal is passed from the microphone 308 to an analogue-to-digital converter (ADC) 310, where it is converted from the analogue domain to the digital domain. Of course, in alternative embodiments the microphone 308 may be a digital microphone and produce a digital data signal (which does not therefore require conversion to the digital domain).

The reflected signal is detected by the microphone 308 in the time domain. However, the features extracted for the purposes of the biometric process may be in the frequency domain (in that it is the frequency response of the user's ear which is characteristic). The system 300 may therefore comprise a Fourier transform module (not shown), which converts the reflected signal to the frequency domain. For example, the Fourier transform module may implement a fast Fourier transform (FFT). The system 300 may comprise a signal Fourier transform module or multiple Fourier transform modules disposed within various modules of the processing circuitry 301. It will be appreciated that some of the modules described below may analyse the received audio signal received from the ADC 310 in the time domain.

The audio signal is passed to an ear canal response (ECR) extract module 314 and an audio response (AR) quality module 315.

The ECR extract module 314 may be configured to extract the response of the user's ear to the acoustic stimulus. In some embodiments, the ECR extract module 314 may be configured to extract one or more features of the audio signal for use in a biometric process (e.g. biometric enrolment, biometric authentication, etc). For example, the ECR extract module 314 may extract the resonant frequency of the user's ear. For example, the ECR extract module 314 may extract one or more mel frequency cepstrum coefficients. Alternatively, the ECR extract module 314 may determine the frequency response of the user's ear at one or more predetermined frequencies, or across one or more ranges of frequencies. The ECR extract module 314 may comprise a Fourier transform module to enable frequency analysis to be performed on the received audio signal.

Feature(s) extracted by the ECR extract module 314 may be passed to a biometric module 316, which performs a biometric process on them. For example, the biometric module 316 may perform biometric enrolment, in which the extracted features (or parameters derived therefrom) are stored as part of biometric template data 318 which is characteristic of the individual (i.e. as an ear print). The template data 318 may be stored within the system 300 or remote from the system 300 (and accessible securely by the biometric module 316). In another example, the biometric module 316 may perform a biometric authentication, and compare the one or more extract features to corresponding features of a template or ear print (or multiple stored ear prints) for authorised users stored as template data 318.

The biometric module 316 generates a biometric result (which may be the successful or unsuccessful generation of an ear print, as well as successful or unsuccessful authentication) and outputs the result to control module 302.

In some embodiments the stimulus waveforms may be tones of predetermined frequency and amplitude. In other embodiments the stimulus generator 303 may be configurable to apply music to the loudspeaker 306, e.g. normal playback operation, and the feature extract module may be configurable to extract the response or transfer function from whatever signal components the stimulus waveform contains.

Thus in some embodiments the ECR extract module 314 may be designed with foreknowledge of the nature of the stimulus, for example knowing the spectrum of the applied stimulus signal, so that the response or transfer function may be appropriately normalised. In other embodiments the ECR extract module 314 may comprise a second input to monitor the stimulus (e.g. playback music) and hence provide the ECR extract module 314 with information about the stimulus signal or its spectrum so that the ECR extract module 314 may calculate the transfer function from the acoustic stimulus to the received audio signal from which it may derive the desired feature parameters. In the latter case, the stimulus signal may also pass to the ECR extract module 314 via a Fourier transform module (not shown). In some embodiments, the estimation of this transfer function may be performed using an adaptive filter.

Figure 4:
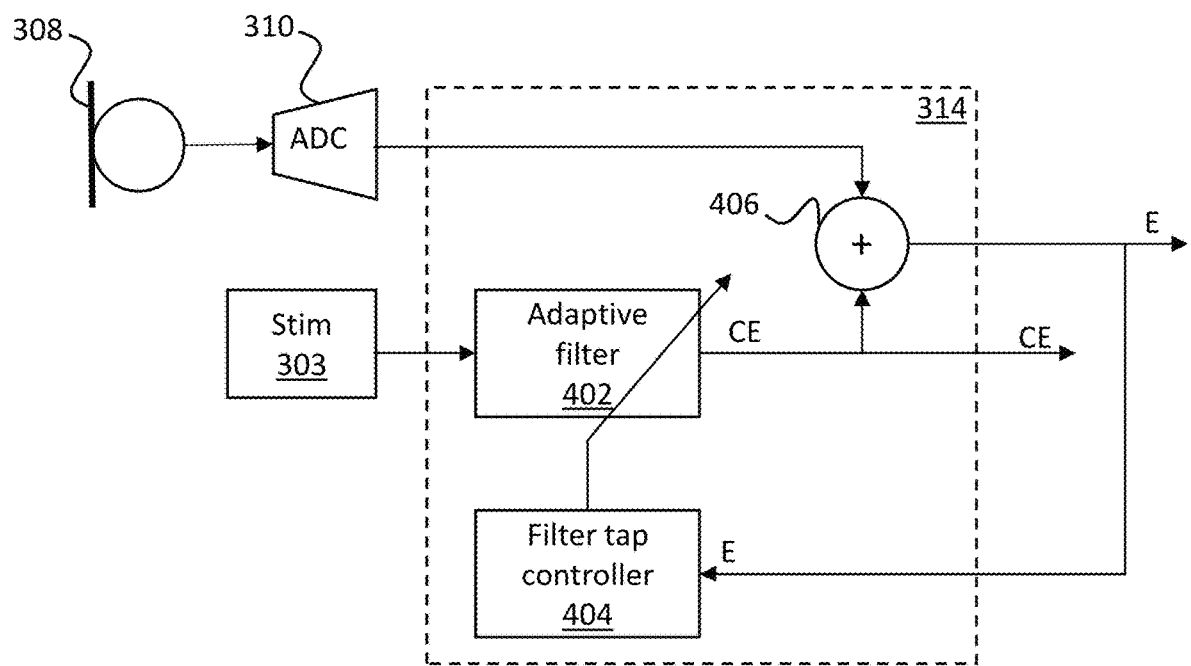
FIG. 4 is a block diagram showing an exemplary implementation of the ear canal response (ECR) extract module of the system in FIG. 3.

FIG. 4 is a schematic diagram of an exemplary implementation of the ECR extract module 314. In this example implementation, the ECR extract module 314 comprises an adaptive filter 402, a filter tap controller 404 and an adder 406. The ECR extract module 314 may additionally comprise other modules not shown to perform one or more additional functions, such as those described above. The adaptive filter 402 is configured to filter the acoustic stimulus to generate a channel estimate CE. The channel estimate CE and the channel audio signal received from the ADC 310 are each provided to the adder 406. The adder 406 outputs an error (or difference) signal E which represents the difference between the channel estimate CE and the channel audio signal output from the ADC 310. This error signal E is provided to the filter tap controller 404 which is configured to adapt coefficients of the adaptive filter 402 to minimize the error signal E. The coefficients of the adaptive filter 402 represent the transfer function between the acoustic stimulus and the received audio signal and can thus be used to determine one or more features of the ear canal response.

Referring again to FIG. 5, the channel estimate CE and the error signal E are provided to an ECR estimate quality module 320. As will be explained in more detail below, the ECR estimate quality module 320 may be configured to determine one or more quality metrics associated with the channel estimate CE (CE quality metrics), the error signal E (error quality metrics), or both CE quality metrics and error quality metrics.

The AR quality module 316 is likewise configured to determine one or more quality metrics. Such quality metrics relate to the audio signal received from the ADC 310. Such quality metrics will be described herein as audio response quality metrics or AR quality metrics.

The ECR estimate quality module 320 and the AR quality module 316 output channel estimate and AR quality metrics to a decision module 322. The decision module may be configured to determine whether to validate or invalidate the audio signal (and the one or more features extracted from the audio signal) for use in the biometric process. The description of different quality metrics below provides some discussion as to the likely impact of particular detected values of the quality metrics on the decision to validate or invalidate. In some embodiments, the decision module 322 may determine to validate or invalidate on the basis of a single quality metric, e.g., by comparing that quality metric value to a threshold. In other embodiments, the decision module 322 may combine multiple quality metrics and compare those metrics to multiple thresholds. In such embodiments, the features may be validated if one, more than one, or all of the quality metrics compare favourably to the thresholds. In still further embodiments, the decision module 322 may implement the results of a machine-learning algorithm to recognise quality metric values or combinations of quality metric values for which the features shall be invalidated. The machine-learning algorithm may be trained on a large sample group of data, prior to use of the system 300 in the field. For example, the machine-learning algorithm may implement a naïve Bayes algorithm, or a neural network. In some embodiments, the decision module 322 may use one or more decision trees to fuse quality metrics. An example of such decision trees includes CART-based decision trees, which have been found to provide an accuracy of >99% in determining a validity of a received audio signal for use in biometrics.

In some embodiments, in addition to or instead of fixed thresholds, probability estimates may be determined by the decision module 322. Thus, the decision module may output one or more probabilities in addition to or instead of binary decisions or scores.

On the basis of the calculated quality metric(s), the decision module 322 may output an indication as to whether the audio signal is valid or invalid for use in the biometric process. In the illustrated embodiment, the indication is output to the biometric module 316 itself, which can then halt a biometric process which is already underway, prevent a biometric process from being carried out, or alter the result of a biometric process which was previously carried out. Alternatively, the indication may be output to a separate module, such as the control module 302, which ensures that the result of a biometric process is not respected if the features are invalidated.

Detailed operation of the ECR estimate quality module 320 and the audio response quality module 315 will now be described.

AR Quality Metrics

As noted above, the AR quality module 315 is coupled to receive the audio response signal from the output of one or more of the microphone 308 and the ADC 310. The AR quality module 315 optionally comprises a Fourier transform module configured to perform a fast Fourier transform or similar algorithm to convert the received audio response into the frequency domain. As such, the AR quality module 315 may be configured to determine one or more quality metrics from the audio response signal in the time domain, the frequency domain, or both.

Figure 5:
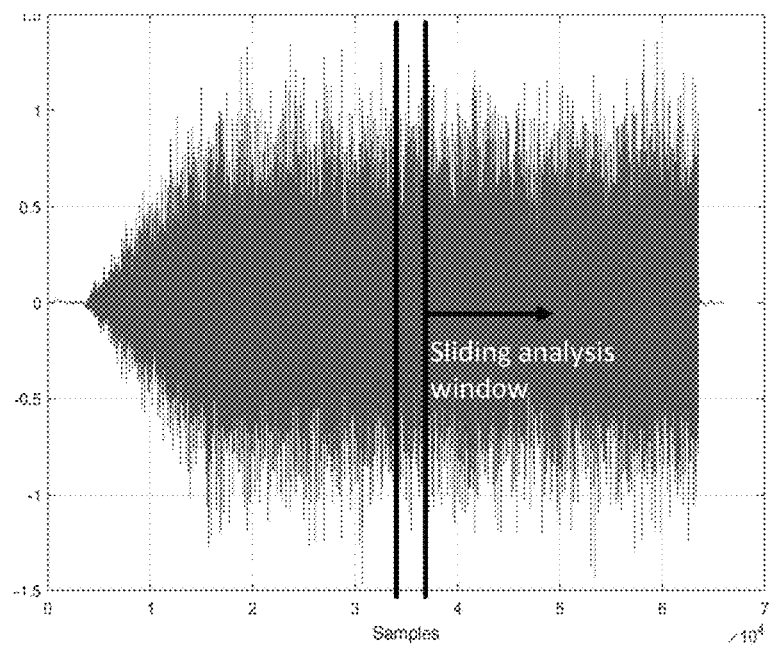
FIG. 5 is a graph showing a sliding analysis window on a received audio signal.

The AR quality module 315 may analyse the entire received audio signal or may implement a sliding or moving time window, analysis performed periodically for samples within the sliding time window. FIG. 5 graphically illustrates such a sliding analysis window good on an example received audio signal of good quality responsive to an acoustic stimulus comprising white noise.

The AR quality module 315 may generally be configured to calculate one or more of the following quality metrics based on the received audio signal in the time domain:

Clipping. The AR quality module 315 may determine the presence or absence of clipping in the received audio signal (i.e. where the microphone 308 is driven beyond its operative range of amplitude). The presence of clipping may indicate that the biometric process should be invalidated, as the quality of data in the signal is not sufficient.

Asymmetry. The AR quality module 315 may determine the presence and extent of any asymmetry between positive and negative durations of the received audio signal waveform. For example, the AR quality module 315 may determine a difference in average power for the positive and negative durations of the waveform. The metric may be used to assess phase and non-linear distortion and may be an indicator of near-overload in the microphone (i.e. as opposed to clipping, in which overload has occurred).

Signal to noise ratio (SNR). The noise may be determined or estimated based on a voice activity detector (VAD), which determines the presence of a voice signal in the received audio signal (i.e. because the user is speaking, or near another person who is speaking). Alternatively the VAD may operate on the basis of the signal generated by a separate voice microphone (not illustrated). The VAD may be used to gate the received audio signal measured in the microphone 308, such that noise is measured or estimated at times when no voice is present in the output of the microphone. The SNR can then be estimated based on the measured received audio signal and the estimated noise. A low SNR may be used to invalidate the use of the features in the biometric process.

Silence detect. If signal is unexpectedly low (regardless of noise)—may be symptom of full or partial microphone blockage by wax/dirt/moisture.

Speech detection. If a voice signal is detected in the received audio signal or a contemporaneously captured voice signal (e.g. as detected by a VAD), the features extracted from the received audio signal may be invalidated.

Min/max statistics. Statistical MIN and MAX may be calculated. Optionally the range may also be calculated. Outliers falling well outside of an expected range may be indicative of a poor quality received audio signal.

Figure 6:
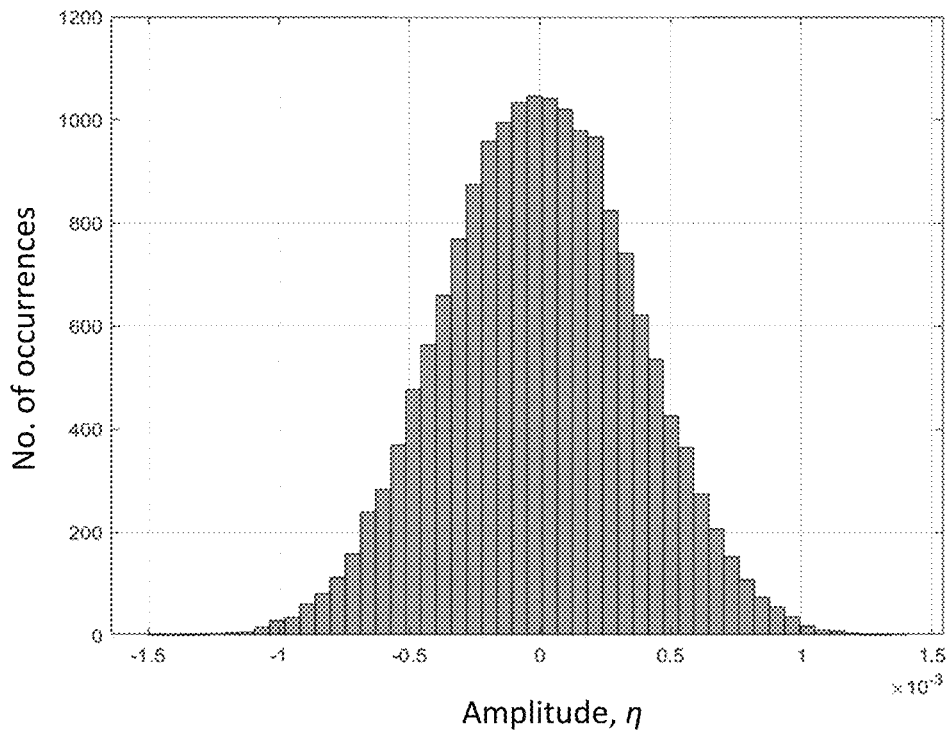
FIG. 6 shows an amplitude histogram for the received audio signal shown in FIG. 5.

Histogram. An amplitude (or magnitude) histogram may be calculated for the received audio signal (entire signal or time windowed), as shown in FIG. 6 (for a white noise acoustic stimulus). Properties of this histogram, such as its distribution shape may be used to calculated. In some embodiments, tail sizes of the histogram may be computed.

Nth order moments and ratios. $1^{st}$, $2^{nd}$, $3^{rd}$ and $4^{th}$ order moments (representing variance, skew and kurtosis) may be determined for the received signal. Ratios of two or more moments may also be computed.

Standard deviation. Standard deviation of the received audio signal and one or more characteristics thereof (e.g. kth moment) may be determined. In addition, the AR quality module 315 may calculate a percentage of samples falling outside of the standard deviation.

Windowed Dixon's test $(x_3-x_1)/(x_{n-2}-x_1)$. Samples $x_1, \ldots, x_n$ may be divided into windows of fixed length. For the purposes of this test, the samples may be ordered by increasing magnitude. A determination may then be made as to whether the number of sample windows for which ordered samples $x_1, \ldots, x_n$ have $(x_3-x_1)/(x_{n-2}-x_1)$ exceeds a predetermined threshold.

Ratio of standard deviation to range (w/s test). This ratio may be calculated to determine the number of sample windows for which this ratio exceeds a predetermined threshold. Again, samples may be divided into windows of fixed length.

Cochran's test—Max $(\sigma_i^2)/\Sigma_i\sigma_i^2$. A determination may be made as to whether $\text{Max}(\sigma_i^2)/\Sigma_i\sigma_i^2$ (where $\sigma$ is the standard deviation) exceeds a predetermined threshold.

The AR quality module 315 may calculate one or more of the following quality metrics based on the received audio signal in the frequency domain:

SNR. As above, albeit characterised in the frequency domain rather than the amplitude domain.

Spectral tilt. The AR quality module 315 may determine the spectral tilt, e.g., the slope of the power spectral density. Spectral tilt can be used to identify loss of low-frequency power due to leakage or loss of spectral discrimination due to a high noise floor.

Spectral Peaking. The AR quality module 315 may determine the number of spectral peaks, or the density of spectral peaks. Spectral peaking can be used to determine: a) if the microphone is in the ear, i.e. the number/density/approximate location of spectral peaks is as expected for an ear; and/or b) if there is some strong (external) interferer coupling to the detected response.

Energy per bin, e.g., the energy in each bin, where each bin defines a range of frequency. The individual values for the bins may be determined, or the mean value of all or a subset of the bins determined by the AR quality module 315. In the former case, the energy per bin may provide a more detailed indication (i.e. more detailed than spectral peaking) as to whether the overall shape of the frequency spectrum is as generally expected for an in-ear microphone, or whether the spectrum is impacted by general interference, or say low frequency noise or high frequency noise. For example, general non-speech movements of the mouth, such as eating, chewing, or teeth chattering, may generate such noise.

Variability of energy per bin. The AR quality module 315 may determine the variability of energy of one or more particular bins (e.g. one or more frequencies or frequency ranges) over time. This parameter can be used to assess how stationary (stable) a noise source is, and thus to decide how stable other metrics are or may be. The variability may be assessed only for noise signals, and thus the measurement may be taken during gaps in speech (e.g., as determined by a VAD). Alternatively, the measurement may be used synergistically with the VAD, e.g., as variability may indicate interfering speech. For example a bandpass filter (e.g. for a frequency range of 2-8 kHz) may be applied to the energy bin samples to provide an ongoing value whose peak-to-peak variability is used as a metric.

It will be appreciated that stored template data 318, for known users or for one or more cohorts of a population, may have been acquired using a known acoustic stimulus (e.g. a stimulus comprising white noise or a known selection of frequency components). However, as noted above, the acoustic stimulus used to excite the ear canal of the use in embodiments of the present disclosure may not be the same as the stimulus used to acquire the template data 318.

In view of this, accumulated statistical quality metrics may be transformed such that they can be compared with templated distributions, their statistical characteristics, and pre-computed thresholds. In other words, in situations where the acoustic stimulus comprises non-white noise, by transforming the accumulated statistic quality metrics, statistical measured derived under white noise conditions can still be applied to the acquired signals and corresponding quality metrics. Such transformation may comprise normalization or standardization (e.g. z-transform). For example, such transformation may comprise a Box-Cox transform (e.g. fixed parameter Box-Cox).

Figure 7:
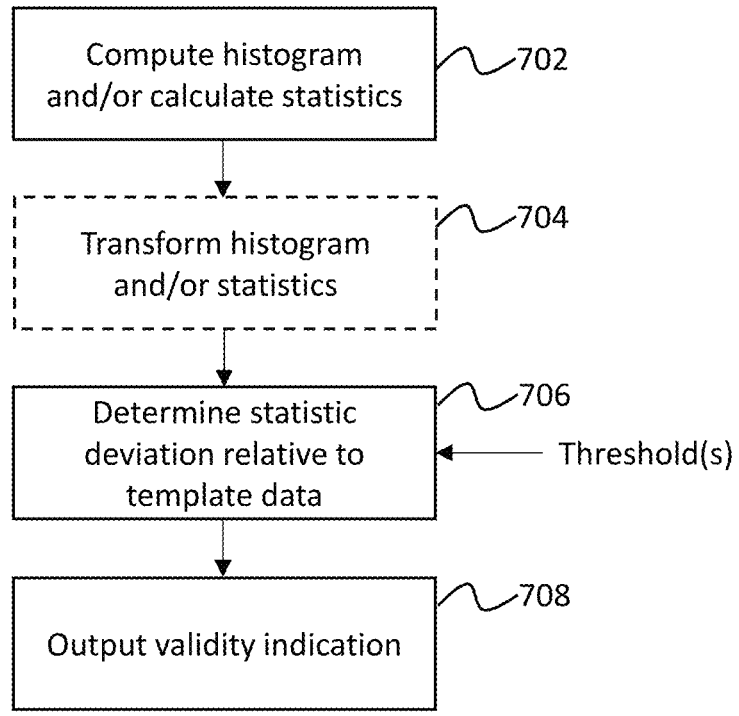
FIG. 7 is a flow diagram for a process for determining validity indication based on the received audio signal shown in FIG. 5.

FIG. 7 is a flow diagram of an example process which may be implemented by the AR quality module 315 for determining one or more validity indication pertaining to one or more statistical AR quality metrics of the received audio signal audio.

At step 702, one or more amplitude histograms may be computed based on received audio data. Additionally or alternatively, one or more statistics may be determined based on the received audio signal and/or the one or more histograms.

Optionally, at step 704, the histogram(s) and/or the statistics may be transformed to enable them to be compared to normal distribution-derived statistic metrics stored in the template data 318. It will be appreciated that if the acoustic stimulus used to derive the templated metrics is substantially similar to the acoustic stimulus used to derive the received audio signal, this transformation step may be omitted.

At step 706, the (optionally transformed) statistic quality metrics are compared with corresponding statistics stored in template data 318. For example, a statistic deviation of calculated between stored template data and the statistic quality metrics. Such deviations may be compared with one or more thresholds to determine whether the quality metrics are within range of expected values.

At step 708, one or more indications of validity of each of the quality metrics are output based on the comparison at step 706.

It will be appreciated that the derivation of quality metrics for the audio response signal may be less processor intensive, may require less energy, and may be faster than the combined operation of the ECR extract module 314 and the ECR estimate quality module 320. As such, in embodiments of the present disclosure, the AR quality module 315 may be configured to control operation one or more of the ECR extract module 314 and the AR quality module 315. Such control may be direct from the AR quality module 315. Alternatively, such control may be indirect, the AR quality module 315 providing derived AR quality metrics to the control module 302 which may in turn control one or both of the ECR extract module 314 and the ECR estimation quality module 320. Control may comprise triggering, adapting or aborting operations being undertaken by one or both of the ECR extract module 314 and the ECR estimation quality module 320. For example, in circumstances where one or more of the determined AR quality metrics fail to meet predetermined thresholds (i.e. fail), one or more operations (such as ECR estimation or the like) may be stopped. By ceasing processes when it is determined that the quality of the received audio signal may be too low, power associated with the operation of the ECR extract module 314 and/or the ECR estimation quality module 320 may be saved.

ECR Estimation Quality

As noted above, the ECR estimate quality module 320 is configured to determine one or more quality metrics associated with the channel estimate CE (CE quality metrics), the error signal E (error quality metrics), or both CE quality metrics and error quality metrics. Preferably the quality metrics determined by the ECR estimate quality module 320 are not affected by the choice of acoustic stimulus, regardless of the acoustic stimulus comprising white noise or non-white noise.

The ECR estimate quality module 320 may derive energy-based channel estimate quality metrics. Additionally or alternatively, the ECR estimate quality module 320 may derive statistical channel estimate quality metrics.

Figure 8:
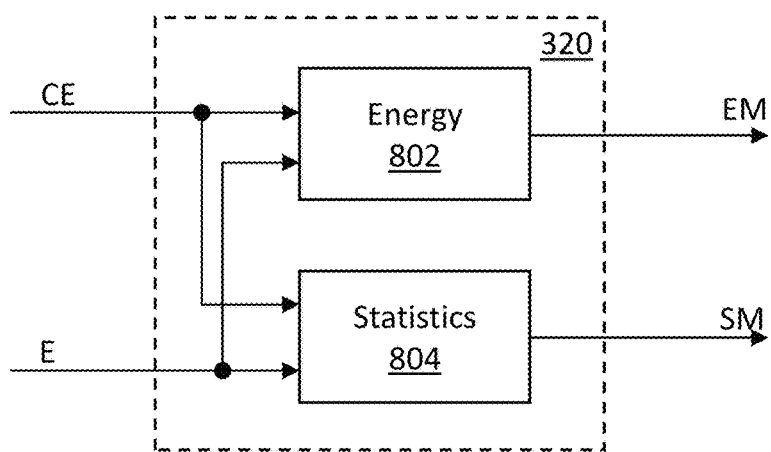
FIG. 8 is a block diagram showing an exemplary implementation of the ECR estimate quality module of the system in FIG. 3.

FIG. 8 is a block diagram showing an exemplary implementation of the ECR estimate quality module 320, comprising an energy metric module 802 and a statistical metric module 804. The ECR estimate quality module 320 may comprise other module(s) not shown to provide other processes described herein. Each of the energy metric module 802 and the statistical metric module 804 may be provide with the channel estimate CE and the error E derived by the ECR extract module 314.

Each of the energy metric module 802 and the statistical metric module 804 may be configured to derive one or more error quality metrics from the error signal and one or more channel estimate quality metrics from the channel estimate CE.

The energy metric module 802 may compute one or more energy based metrics for one or both of the channel estimate CE and the error E. Such metrics may measure conformance of tap-weight distribution characteristics to corresponding distribution characteristics of genuine (or plausible) ECR. Such a distribution characteristics may be provided in the memory 324 or as template data 318 or otherwise. Energy-based metrics offer a relatively low complexity method of characterising ECR shape and ear canal physical constraints. A benefit of such metrics is that no direct pattern (statistical) recognition is required for anomaly detection.

Figure 9:
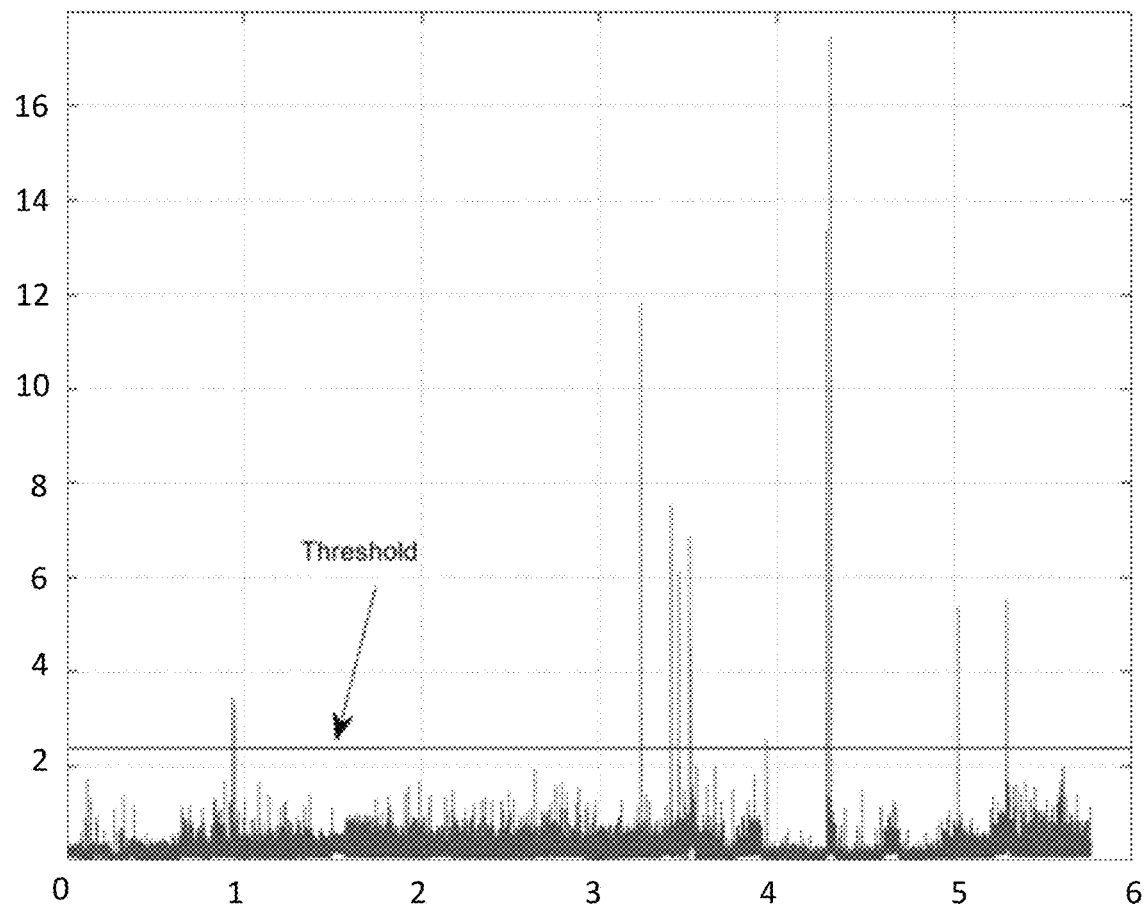
FIG. 9 is a graph showing total tap energy norms for a received audio signal.

Energy-based quality metrics may include one or more of the following:

Total tap energy norm. FIG. 9 illustrates a distribution of total energy norm outliers for a received audio signal. It can be seen that a threshold can be set to trigger on detection of total energy norm outliers in the channel estimate CE.

Figure 10:
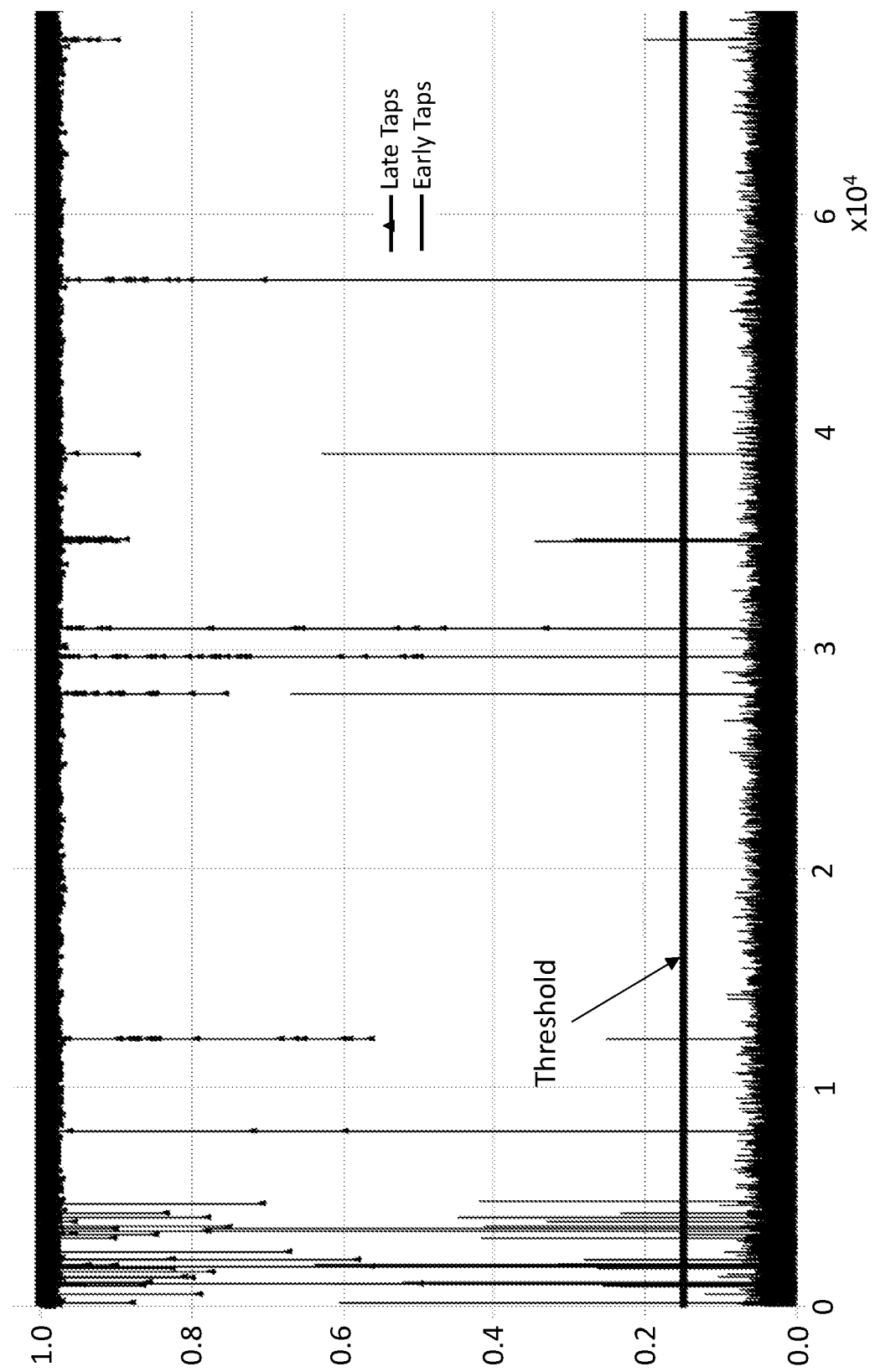
FIG. 10 is a graph showing early and late total tap energy norms for a received audio signal.

A ratio of two or more tap energy norms, for example a ratio of an early tap energy norm to a late tap energy norm. FIG. 10 graphically illustrates a distribution of early and late tap norm outliers for a received audio signal.

A ratio of a first reflection peak height to total tap energy norm. Such a ratio may optionally be weighted by reflection peak location in time.

Slope and intercept of regression fit to log|H(f)|, where H(f) is a Hilbert transform of the CE estimate (which may optionally be smoothed).

Figure 11:
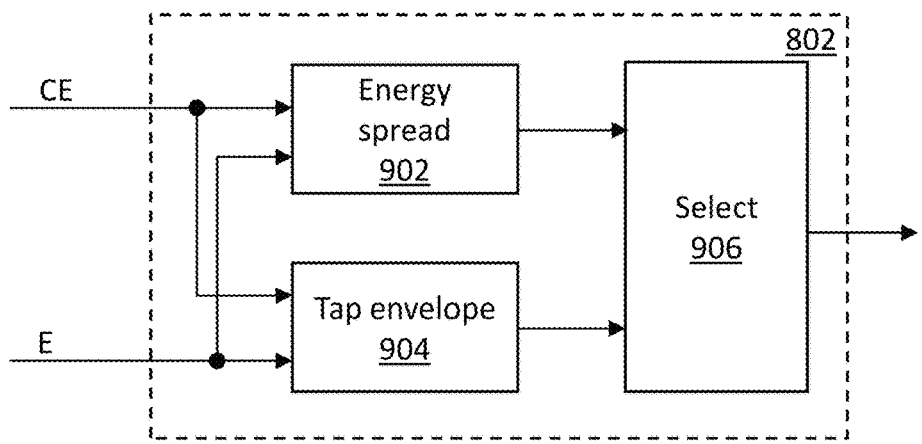
FIG. 11 is a block diagram showing an exemplary implementation of the energy metric module of FIG. 8.

FIG. 11 is a block diagram of an example implementation of the energy metric module 802, comprising an energy spread module 902, a tap envelope module 904 and a selection module 906. Each of the energy spread and tap envelope modules 902, 904 receive both the channel estimate CE and the error E.

The energy spread module 902 may be configured to determine one or more metrics pertaining to tap energy of the channel estimate CE. Such metrics may, for example, one or more of total tap energy, the ratio of two or more tap energies.

The tap envelope module 904 may be configured to determine one or more metrics pertaining to the envelope of the channel estimate CE, such as envelope curvature, a tightness of one or more bounds, a location of one or more inflexion points, and whether the envelope is monotonic or non-monotonic (decreasing or not decreasing).

The selection module 906 may receive energy spread and tap envelope metrics and select one of more to be output from the energy metric module 802.

The energy metric module 802 may be configured to compare the various determined quality metrics with one or more predetermined threshold values above or below which indicates a valid or invalid received audio signal. Such thresholds may be adaptable. For example, one or more thresholds may be adaptable based on one or more characteristics of the error E.

Referring again to FIG. 8, the statistical metric module 804 may be configured to determine one or more statistical quality metrics. Such metrics may assess the quality of the error E. Such an assessment may comprise comparing the error E with a typical error or distribution of error terms for well-converged estimates of the channel. It will be appreciated that convergence of the channel estimate CE will lead to small error E, ideally close to the noise floor. As such, the statistical metric module 804 may primarily statistically analyse the error E associated with the adaptive filter 402. Example statistical metrics which may be derived by the statistical metric module 804 include 3rd and 4th moments of the error term (for skew and kurtosis etc.) and a decay rate of higher order moments across frames of the received audio signal.

Figure 12:
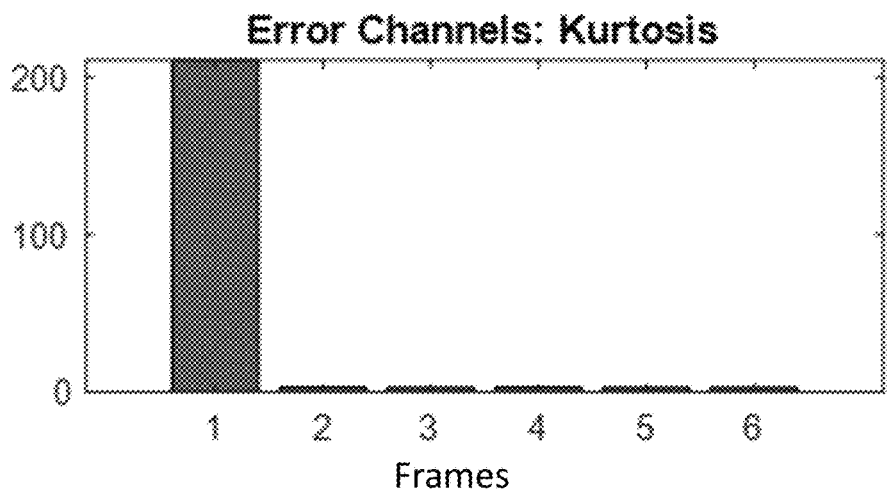
FIGS. 12 and 13 are bar charts showing kurtosis of error in six frames for well-converging and ill-converging error respectively.
Figure 13:
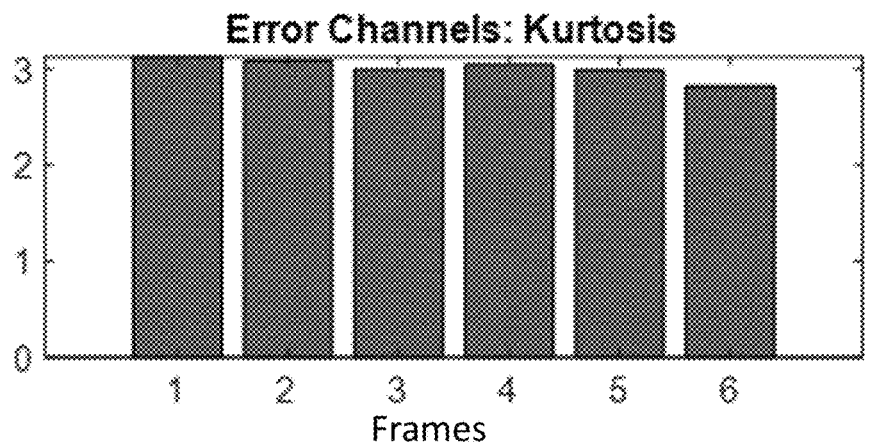

FIGS. 12 and 13 graphically illustrate kurtosis (4th moment) from a well-converged error term E over 6 frames (FIG. 11) and an ill-converged error term E over 6 frames (FIG. 12). It can be seen that by monitoring kurtosis over multiple frames, a determination regarding the convergence of the error term E, by proxy, the validity of the received audio signal can be determined.

Statistical quality metrics may then be output by the statistical metric module 804. As noted above, quality metrics associated with the error E may be used to adapt one or more thresholds used to qualify metrics (E.g. energy metrics) associated with the channel estimate CE.

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog TM or VHDL (Very high speed integrated circuit Hardware Description Language). As the skilled person will appreciate, the code may be distributed between a plurality of coupled components in communication with one another. Where appropriate, the embodiments may also be implemented using code running on a field-(re) programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

Embodiments may be implemented in a host device, especially a portable and/or battery powered host device such as a mobile computing device for example a laptop or tablet computer, a games console, a remote control device, a home automation controller or a domestic appliance including a domestic temperature or lighting control system, a toy, a machine such as a robot, an audio player, a video player, or a mobile telephone for example a smartphone.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. A method in a biometric authentication system, comprising:
   generating an acoustic stimulus for application to a user's ear;
   receiving an audio signal representing a response of the user's ear canal to the acoustic stimulus;
   adapting an ear canal response estimate of the user's ear canal to the acoustic stimulus to reduce an error between the audio signal and the ear canal response estimate;
   calculating one or more quality metrics, the quality metrics comprising one or more of:
      an ear canal response estimate quality metric comprising one or more energy characteristics of the ear canal response estimate;
      an error quality metric derived from the error;
      an audio response quality metric comprising one or more statistical characteristics of the audio signal;
   determining a validity of the audio signal for use in a biometric process based on the quality metrics; and
   aborting the adaptation of the ear canal response estimate based on the audio response quality metric.

2. The method of claim 1, further comprising:
   combining two or more of the one or more quality metrics to generate a combined quality output, wherein the audio signal is validated based on the combined quality output.

3. The method of claim 1, further comprising:
   aborting the adaptation if it is determined that the one or more statistical characteristics fail to meet one or more predetermined criteria.

4. The method of claim 1, wherein the one or more statistical characteristics comprises one or more of:
   a shape of a distribution of the audio signal;
   a tail size of a distribution of the audio signal.

5. The method of claim 1, wherein the one or more statistical characteristics are accumulated over time by analysing the audio signal over a moving time window.

6. The method of claim 1, further comprising:
   comparing the one or more statistical characteristics with one or more template statistical characteristics.

7. The method of claim 6, further comprising:
   transforming the one or more statistical characteristics before the comparison.

8. The method of claim 7, wherein transforming the one or more statistical characteristics comprises one or more of normalization or standardization.

9. The method of claim 1, further comprising:
   comparing a statistical distribution of the error with a template error distribution; and
   determining the validity of the audio signal for use in a biometric process based on the comparison.

10. The method of claim 9, wherein the statistical distribution of the error comprises one or more of:
    a $3^{rd}$ order moment;
    a $4^{th}$ order moment;
    a decal of a $3^{rd}$ order moment or a $4^{th}$ order moment over time.

11. The method of claim 1, wherein the one or more energy statistics comprises one or more of:
    a total tap energy norm;
    a total tap energy norm ratio;
    a ratio of a first reflection peak to a total tap energy norm;
    a slope of intercept of a regression fit to log|H(f)|, where H(f) is a Hilbert transform of the ear canal response estimate;
    an envelope curvature of the ear canal response estimate.

12. The method of claim 1, further comprising:
    comparing the one or more energy statistics with one or more energy statistic thresholds; and
    determining the validity of the audio signal for use in a biometric process based on the comparison.

13. The method of claim 12, wherein the one or more energy statistic thresholds are adapted based on the error.

14. The method of claim 12, wherein the one or more energy statistic thresholds are adapted based on a depth of convergence terms of the ear canal response estimate.

15. A non-transitory machine-readable medium storing instructions which, when executed by one or more processors, cause an electronic apparatus to perform the method of claim 1.

16. A biometric authentication system, comprising:
    a first transducer configured to generate an acoustic stimulus for application to a user's ear;
    a second transducer for generating an audio signal representing a response of the user's ear canal to the acoustic stimulus;
    one or more processors configured to:
       adapt an ear canal response estimate of the user's ear canal to the acoustic stimulus to reduce an error between the audio signal and the ear canal response estimate;
       calculate one or more quality metrics, the quality metrics comprising one or more of:
          an ear canal response estimate quality metric comprising one or more energy characteristics of the ear canal response estimate;
          an error quality metric derived from the error;

an audio response quality metric comprising one or more statistical characteristics of the audio signal;

determine a validity of the audio signal for use in a biometric process based on the one or more quality metrics; and aborting the adaptation of the ear canal response estimate based on the audio response quality metric.

17. A method in a biometric authentication system, comprising:

generating an acoustic stimulus for application to a user's ear;

receiving an audio signal representing a response of the user's ear canal to the acoustic stimulus;

calculating one or more quality metrics comprising an audio response quality metric representing a quality of the audio signal;

controlling, based on the audio response quality metric, adaptation of an ear canal response estimate of the user's ear canal to the acoustic stimulus to reduce an error between the audio signal and the ear canal response estimate; and aborting the adaptation of the ear canal response estimate based on the audio response quality metric.

18. The method of claim 17, wherein the controlling comprises:

triggering the adaptation of the ear canal response estimate based on a value of the audio response metric.

19. An electronic device comprising the biometric authentication system of claim 16.

20. A biometric authentication system, comprising:

a first transducer configured to generate an acoustic stimulus for application to a user's ear;

a second transducer for generating an audio signal representing a response of the user's ear canal to the acoustic stimulus;

one or more processors configured to:

calculating one or more quality metrics comprising an audio response quality metric representing a quality of the audio signal;

controlling, based on the audio response quality metric, adaptation of an ear canal response estimate of the user's ear canal to the acoustic stimulus to reduce an error between the audio signal and the ear canal response estimate; and aborting the adaptation of the ear canal response estimate based on the audio response quality metric.

21. A method in a biometric authentication system, comprising:

generating an acoustic stimulus for application to a user's ear;

receiving an audio signal representing a response of the user's ear canal to the acoustic stimulus;

adapting an ear canal response estimate of the user's ear canal to the acoustic stimulus to reduce an error between the audio signal and the ear canal response estimate;

calculating one or more quality metrics, the quality metrics comprising one or more of:

an ear canal response estimate quality metric comprising one or more energy characteristics of the ear canal response estimate;

an error quality metric derived from the error;

an audio response quality metric comprising one or more statistical characteristics of the audio signal;

combining two or more of the one or more quality metrics to generate a combined quality output; and determining a validity of the audio signal for use in a biometric process based on the combined quality output.

22. A method in a biometric authentication system, comprising:

generating an acoustic stimulus for application to a user's ear;

receiving an audio signal representing a response of the user's ear canal to the acoustic stimulus;

adapting an ear canal response estimate of the user's ear canal to the acoustic stimulus to reduce an error between the audio signal and the ear canal response estimate;

comparing a statistical distribution of the error with a template error distribution; and determining a validity of the audio signal for use in a biometric process based on the comparison.

23. A method in a biometric authentication system, comprising:

generating an acoustic stimulus for application to a user's ear;

receiving an audio signal representing a response of the user's ear canal to the acoustic stimulus;

adapting an ear canal response estimate of the user's ear canal to the acoustic stimulus to reduce an error between the audio signal and the ear canal response estimate;

comparing one or more energy statistics of the ear canal response estimate with one or more energy statistic thresholds, the one or more energy statistic thresholds are adapted based on the error; and determining a validity of the audio signal for use in a biometric process based on the comparison.

* * * * *